(12) United States Patent
Schonlau et al.

(10) Patent No.: US 8,392,085 B2
(45) Date of Patent: Mar. 5, 2013

(54) METHOD AND DEVICE FOR CONTROLLING A MOTOR VEHICLE COMPRISING AN ELECTRONICALLY CONTROLLED BRAKE SYSTEM WITH DRIVING DYNAMICS CONTROL

(75) Inventors: Jürgen Schonlau, Walluf (DE); Manfred Rüffer, Sulzbach (DE); Dieter Merkel, Darmstadt (DE); Oliver Kugland, Epstein (DE); Torsten Queisser, Frankfurt (DE); Thomas Voigtmann, Friedrichsdorf-Köppern (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1365 days.

(21) Appl. No.: 10/582,070

(22) PCT Filed: Dec. 8, 2004

(86) PCT No.: PCT/EP2004/053344
§ 371 (c)(1),
(2), (4) Date: Mar. 11, 2009

(87) PCT Pub. No.: WO2005/056359
PCT Pub. Date: Jun. 23, 2005

(65) Prior Publication Data
US 2009/0210124 A1 Aug. 20, 2009

(30) Foreign Application Priority Data

Dec. 9, 2003 (DE) .................................. 103 57 385
Dec. 6, 2004 (DE) ......................... 10 2004 058 875

(51) Int. Cl.
*B60T 8/172* (2006.01)

(52) U.S. Cl. .............. 701/70; 701/78; 701/79; 340/453; 303/122.03

(58) Field of Classification Search .................... 701/70, 701/76, 78, 79; 340/452, 453; 303/122, 303/122.09, 122.12, 122.03
See application file for complete search history.

(56) References Cited

U.S. PATENT DOCUMENTS
(Continued)

FOREIGN PATENT DOCUMENTS

| DE | 19622545 | 12/1997 |
|----|----------|---------|
| EP | 0509240 | 10/1992 |
| WO | 0236400 | 5/2002 |
| WO | 02066307 | 8/2002 |

(Continued)

*Primary Examiner* — Khoi Tran
*Assistant Examiner* — Spencer Patton
(74) *Attorney, Agent, or Firm* — Brinks Hofer Gilson & Lione

(57) ABSTRACT

A motor vehicle includes an electrohydraulic brake system with driving dynamics control, a master brake cylinder (1), wheel brakes (75-78), and at least one pressure fluid supply device (94, 95) actuated by an electronic control unit. The pressure can be applied to the wheel brakes (75, 76, 77, 78) of the vehicle which are also connectable to the master brake cylinder (1) by way of a closable hydraulic connection (73, 74). A device for detecting a brake application includes a magnet (35) as a signal transmitter and a sensor element (36). The sensor element (36), upon piston movement of the master cylinder (1), senses a change in the magnetic field and outputs a digital signal and an analog signal. The two signals are passed on to an electronic control unit and are evaluated in the electronic control unit.

8 Claims, 2 Drawing Sheets

U.S. PATENT DOCUMENTS

| | | | |
|---|---|---|---|
| 5,154,107 A * | 10/1992 | Morin et al. | 92/13.3 |
| 6,322,165 B1 * | 11/2001 | Klein et al. | 303/119.2 |
| 2003/0000375 A1 | 1/2003 | Zumberge et al. | |
| 2004/0069580 A1 * | 4/2004 | Fleming et al. | 188/265 |

FOREIGN PATENT DOCUMENTS

| | | |
|---|---|---|
| WO | 2004035362 | 4/2004 |
| WO | 2005032896 | 4/2005 |

* cited by examiner

METHOD AND DEVICE FOR CONTROLLING A MOTOR VEHICLE COMPRISING AN ELECTRONICALLY CONTROLLED BRAKE SYSTEM WITH DRIVING DYNAMICS CONTROL

BACKGROUND OF THE INVENTION

The invention relates to a method and a device for controlling a motor vehicle comprising an electrohydraulic brake system with driving dynamics control, a master brake cylinder operable by means of a brake pedal, at least one pressure fluid supply device which can be actuated by an electronic control unit and the pressure of which can be applied to wheel brakes of the vehicle which are connectable to the master brake cylinder, on the other hand, by way of at least one hydraulic connection that is closable by means of a separating valve, each one inlet valve and one outlet valve connected upstream of the wheel brakes, as well as with a device for detecting brake application which comprises a magnet as a signal transmitter and a sensor element.

In principally known driving dynamics control systems, a driving dynamics control action regularly causes automatic interruption of a hydraulic connection between master cylinder and wheel brakes which is normally constantly opened, with the result that one or both of the pistons of the master cylinder in braking maneuvers during the driving dynamics control action (ESP control intervention) or during an ABS intervention is quasi undisplaceable in relation to the housing due to the separating valves being closed. One cause is that pressure fluid cannot be conducted in the direction of the wheel brakes. The ESP intervention takes place irrespective of the driver, and the rudimentary piston travel is not sufficient to indicate a change of travel. Also, the ESP action cannot be interrupted by the driver so that only limited deceleration is possible. Further, an actuating signal cannot be generated, and e.g. stop light signaling is impossible. The traffic in the rear is informed about the braking request of the driver only after the driving dynamics control action is completed.

Another special objective is to avoid accidents and reduce the consequences of an accident. To this end, passive and active safety systems are cross-linked to each other in order to achieve data exchange among the safety systems and thus provide information about the vehicle's condition, the vehicle ambience and the driver himself.

In view of the above, the objective is to offer a method and a device which is simple in terms of its structure to solve the problems, i.e. to enable reliable monitoring of a piston also during a driving dynamics control action, and to detect the driver's request during the entire actuating travel in order to optimize control operations of the vehicle by detecting the driver's request.

SUMMARY OF THE INVENTION

To solve this object, a method is disclosed whose particular feature involves that the sensor element upon piston movement of the master cylinder senses a change in the magnetic field and outputs a digital signal and an analog signal, that the two signals are passed on to an electronic control unit, and that the two signals are evaluated in the electronic control unit. This provides a certain redundancy of the signals during normal operation. The evaluation of the analog signal allows sensing the brake pedal movement and the state of the brake pedal (state of actuation, holding state, or release state), that means it is not only sensed whether the brake pedal or the piston connected thereto is moving and where the piston is positioned in relation to the housing, but it is possible to make a qualitative statement about the movement, such as the speed, or the direction of movement of the brake pedal.

In addition, the method of the invention renders it possible to detect abutment of the second piston on the housing. The control unit drives a pump in this case which connects an additional pressure fluid volume and displaces it in the direction of the wheel brakes. This sensing of the piston abutment allows rating the master cylinder volume to be smaller than in prior art master cylinders, with the result that the overall length of the master cylinder and hence the pedal travel are shortened without loss in comfort or function. The behavior in crash situations is thereby improved.

Further, the driver request detection can optimize control operations such as e.g. ESP interventions into the braking operation.

As the digital signal is less susceptible to fault it is evaluated with priority, preferably upon brake application, when no driving dynamics control operation is performed in the vehicle.

If, however, brake application during a driving dynamics control operation is sensed, the analog signal is given priority in the evaluation because the piston is at standstill or moves only minimally. Thus, the driver's request can be detected also during an ESP control intervention because the analog signal allows detecting minimal signal fluctuations, i.e. minimal changes in the magnetic field.

To detect a panic stop of the driver, the analog signal can be used to identify the actuating speed of the brake pedal, whereby corresponding control operations can be initiated by means of the electronic control unit.

It is further feasible according to a favorable improvement that the analog signal is used to establish a theoretical pressure in the hydraulic connection, which is compared with a pressure measured by means of a pressure sensor in order to detect inclusions of air in the brake system.

Signal processing of the analog signal, e.g. signal amplification, can take place in the sensor element according to a favorable embodiment of the invention. It is, however, also feasible to process the analog signal in the control unit.

According to the invention, a device especially for implementing this method involves that a first Hall-IC and a second Hall-IC are provided in the sensor element, with the first Hall-IC furnishing the digital signal, while the second Hall-IC furnishes the analog signal. The invention discloses a relatively simply designed, non-contact concept without any wear phenomena over the entire useful like, and the mounting space of the master cylinder can be optimized in addition.

In a favorable embodiment, the magnet is arranged on a piston of the master cylinder, and for the arrangement of the magnet, the piston includes a first cylindrical peg-shaped piston portion, which can be shaped at the piston when said is manufactured without increased expenditure. The magnet, which is designed as a ring magnet, for example, can thus be arranged in a centered manner on the piston by simple means. It is therefore unnecessary to mount the piston in a defined position into the housing, thereby obviating the need for an anti-rotation mechanism of the piston, whereby the sensor element can be arranged theoretically in any desired position at the periphery of the housing.

Preferably, the piston includes a second cylindrical peg-shaped piston portion and an annular plate for positioning the magnet and for supporting a sleeve that is connected to the first piston on the second cylindrical peg-shaped portion. This condition allows providing the piston with the magnet as a pre-assembled unit.

Ease of manufacture of the piston-and-magnet subassembly is achieved in that the annular plate can be fastened on the second cylindrical peg-shaped portion by means of reshaping the second cylindrical peg-shaped portion.

The drawing shows a cross-sectional view of a favorable embodiment of the device of the invention, which is described in detail in the following.

DETAILED DESCRIPTION OF THE DRAWINGS

Figure 1:
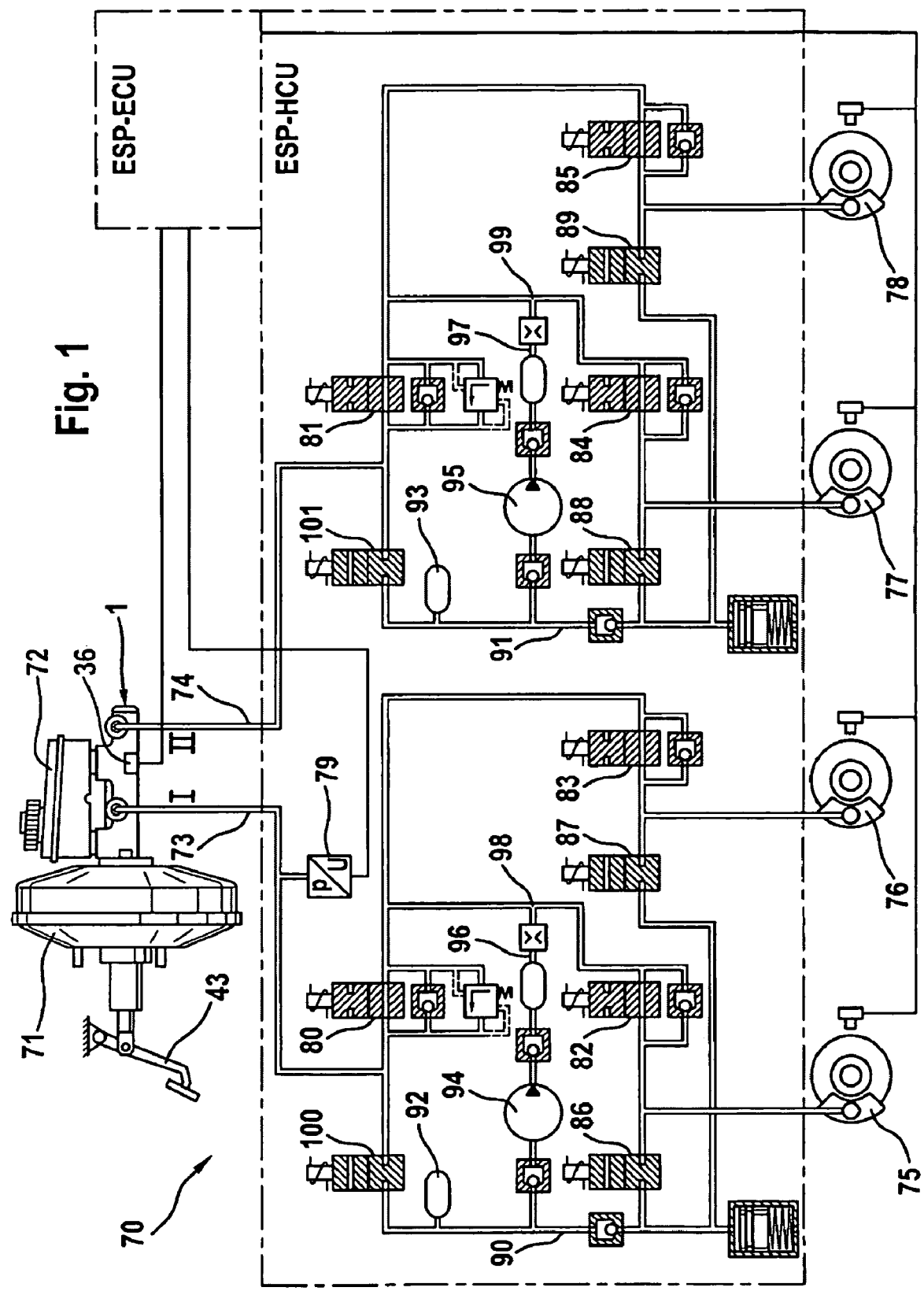
FIG. 1 shows an electrohydraulic brake system with a driving dynamics control (ESP)

FIG. 1 serves to explain an electrohydraulic brake system 70 with a driving dynamics control (ESP). The brake system 70 comprises a brake device with a pneumatic brake booster 71, a pedal-operated master cylinder 1 with a pressure fluid supply reservoir 72, and pressure chambers of the master cylinder 1 are connected to the wheel brakes 75-78 by way of brake lines 73, 74. Wheel brakes 75-78 are combined in pairs in so-called brake circuits I, II. Regarding the brake circuits I, II, the so-called diagonal circuit allotment grouping diagonally opposite wheel brakes of the front axle and the rear axle of a vehicle has become generally accepted, while principally a different circuit allotment such as the so-called black/white allotment is also possible, combining the wheel brakes of one axle in a pair.

A pressure sensor 79 at the brake line 73 is used to sense a pressure introduced by the driver, the brake line connecting a pressure chamber to the wheel brakes 75, 76 of brake circuit I. Each brake line 73, 74 includes in a serial arrangement electromagnetic separating valves 80, 81 and each one inlet valve 82-85 and each one outlet valve 86-89 for each wheel brake 75-78. The two wheel brakes 75, 76; 77, 78 of each one brake circuit I, II are connected to a return line 90, 91, with the outlet valve 86-89 being respectively inserted into the line branches per wheel brake 75-78. Connected downstream of the outlet valves 86-89 in each return line 90, 91 is a low-pressure accumulator 92, 93 that is connected to an inlet of an electromotively driven pressure fluid supply device 94, 95 feeding the two brake circuits I, II. There is a hydraulic connection between an outlet of each pressure fluid supply device 94, 95 and the associated brake circuit I, II by way of pressure channel 96, 97 and a branch line 98, 99, and the pressure increase in the wheel brakes 75-78 is controllable by way of the inlet valves 82-85. This renders it possible to introduce pressure into the wheel brakes 75-78 by way of the pressure fluid supply devices 94, 95 for the purpose of driving stability interventions or for braking operations, without having to make use of a central high-pressure accumulator such as in electrohydraulic brake systems.

In order to allow changing between ABS return delivery operations (supply direction in the direction of the master brake cylinder 1) and TCS or ESP driving dynamics control operations (supply direction in the direction of the wheel brakes) by means of the pressure fluid supply devices 94, 95, one change-over valve 100, 101 is respectively integrated in the aspiration branch of each pressure fluid supply device 94, 95, said valve being able to establish a pressure fluid connection between the master cylinder 1 and the inlet of the pressure fluid supply devices 94, 95 when driving dynamics control is active.

Figure 2:
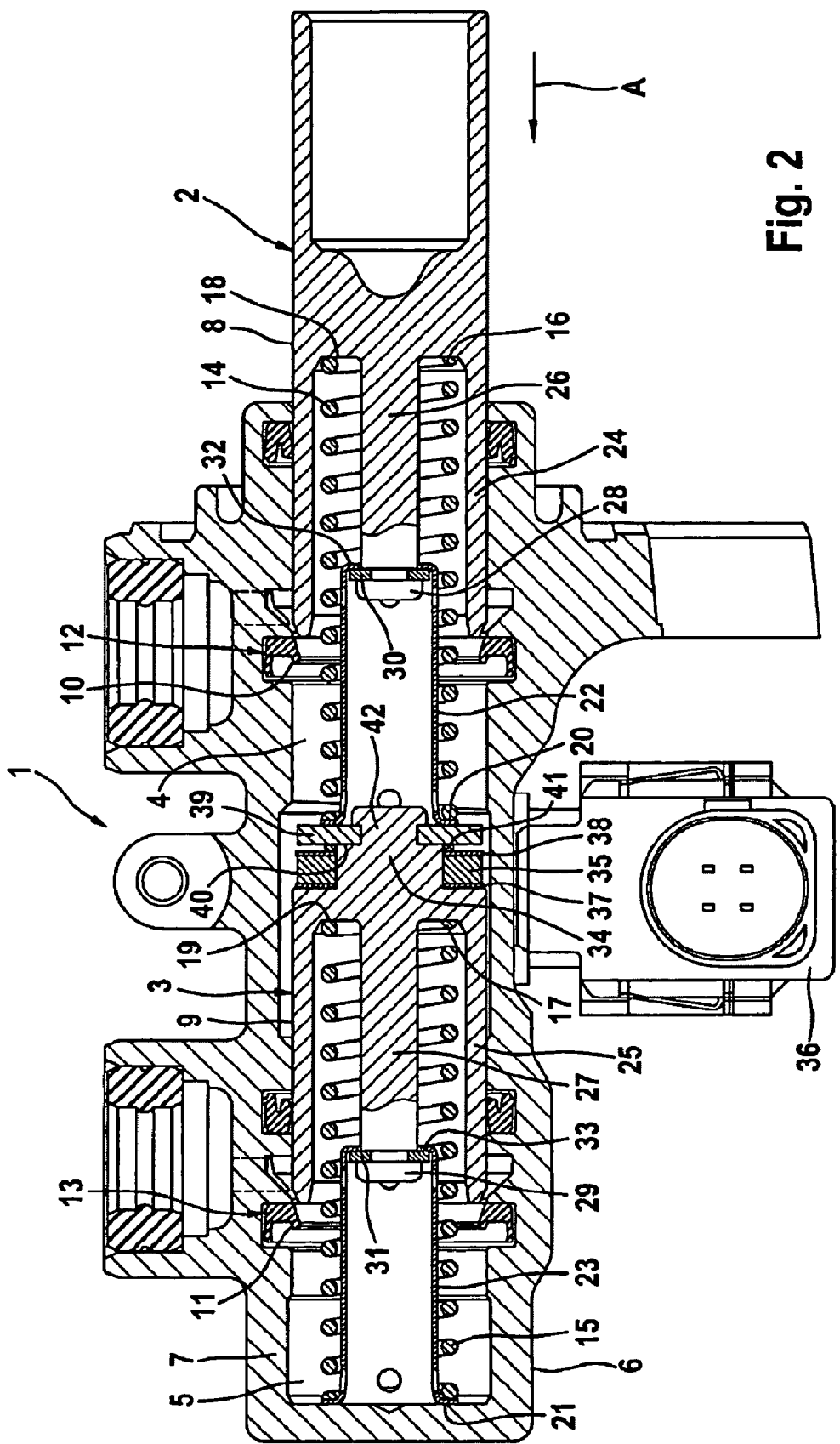
FIG. 2 shows the master cylinder of the brake system.

FIG. 2 shows the master cylinder 1 with a first and a second piston 2, 3 for first and second pressure chambers 4, 5, with the pistons 2, 3 being displaceably arranged within a housing 6 for the purpose of supplying pressure fluid to the wheel brakes 75-78. A brake pedal 43 illustrated in FIG. 1 is connected indirectly or directly to the first piston 2.

The master cylinder 1 is of the so-called plunger type with stationary sealing cups 12, 13 arranged in a housing wall 7 and abutting on a piston wall 8, 9 with a sealing lip 10, 11 for sealing the pressure chambers 4, 5. Fluid can flow over the sealing lips 10, 11 in the direction of the wheel brake if a pressure gradient is adjusted between the pressure fluid supply reservoir and the wheel brake (not shown). For the non-actuated operating condition, further, a pressure-compensating connection is established between the two pressure chambers 4, 5 so that a general pressure balance exists also between the two brake circuits for this non-actuated operating condition.

Associated with each of the pistons 2, 3 is a resetting spring 14, 15, which is supported with one end 16, 17 on a piston bottom 18, 19, while with its other end it is supported indirectly on the housing 6 by way of a collar 20, 21 of a sleeve 22, 23. In the event of piston displacement in an actuating direction A, the resetting spring 14, 15 is compressed, and it is expanded for piston resetting purposes.

Starting from the piston bottom 18, 19, the pistons 2, 3 have a bowl-shaped wall 24, 25 within which the resetting spring 14, 15 is arranged at least in part. Extending centrally through the wall 24, 25 is a centric peg 26, 27, which ends before its axial exit from the wall 24, 25. This end 28, 29 is provided with a stop 30, 31 for the sleeve 22, 23 that cooperates with a collar 32, 33 in such a fashion that the sleeve 22, 23 can be telescoped within limits in relation to the peg 26, 27. More precisely, the sleeve 22, 23 with resetting spring 14, 15 is urged into the interior of the piston upon actuation. As can be seen, the stop 30, 31 is preferably an annular washer, which is riveted, in particular wobble-riveted, to the peg 26, 27. The other end of sleeve 22, 23 has the plate-type collar 20, 21 for abutment of the resetting spring 14, 15.

The second piston 3 additionally has a first cylindrical peg-shaped piston portion 34 that is opposed to the peg 27 and a second cylindrical peg-shaped piston portion 42, and a permanent magnet 35 is arranged on the first piston portion 34.

A device for the detection of a brake application comprises the magnet 35 as a signal transmitter and a sensor element 36; and magnet 35 sends a magnetic field radially in the direction of sensor element 36, which is provided stationarily at housing 6, and can be connected to an electronic control unit (not shown) in order to allow position detection.

The magnet 35 is annular and, as is apparent, is arranged between plates 37, 38, so-called pole plates, made of a magnetic material. Plates 37, 38 allow bundling the magnetic field so that the wall of housing 6 can have a sufficiently thick design in order to withstand even high pressure load. In addition, the effect of force on the magnet 35 is homogenized by distributing the force over a larger surface, and the magnet 35, in case it is breaking, is held together by the plates 37, 38.

As can be taken from FIG. 2, an annular plate 39 is arranged on the second cylindrical peg-shaped piston portion 42 and is used to position the magnet 35 and to support the sleeve 22. The plate 39, which bears against a step 40 that is provided between the first and the second piston portion 34, 42, is fastened by way of reshaping the second cylindrical peg-shaped portion 42, in particular by wobble-riveting.

Interposed between the magnet 35 or the pole plate 38 and the plate 39 is an elastic element 42, e.g. in the form of an O-ring, which is deformed, i.e. compressed, during the attachment of the plate 39 and, thus, maintains the magnet 35 and the pole plates 37, 38 in abutment on the wall 25.

A first and a second Hall-IC (both not shown) are arranged in the sensor element 36, the first Hall-IC supplying a digital signal, while the second Hall-IC supplies an analog signal. Consequently, there is a certain redundancy of the signals in normal operation.

When the first piston 2 is displaced in the actuating direction A by way of the brake pedal (not shown), the second piston 3 as well as the magnet 35 are displaced in parallel to piston 2 due to the spring forces during a normal braking operation. As this occurs, the sensor element 36 senses a change in the magnetic field, and the first and the second Hall-IC provide a digital and analog signal.

The digital signal detects a defined threshold value of the magnetic field and, therefore, acts as a controlled switch only as a break contact or make contact of a current circuit. The analog signal, which can be processed, e.g. amplified, in the sensor element 36 or in an electronic control unit, furnishes a statement about the brake pedal movement or the state of the brake pedal (state of actuation, holding state or state of release), respectively.

These two signals are sent to an electronic control unit, such as an engine control or a control of a power supply system, and evaluated therein, with the result that e.g. a stop light can be actuated or a cruise control system can be switched off.

Because the digital signal is less susceptible to faults, it is evaluated with priority in the normal operation, i.e. in the absence of a control intervention, such as ESP or ABS.

The plausibilisation of the signals can be defined in the software of the electronic control unit, that means, this plausibilisation is not compulsory and it is likewise possible to give priority to the analog signal in an evaluation during normal operation.

In an ESP control intervention where e.g. the second piston 3 is stationary or moves only minimally in spite of an application of the brake pedal, due to the fact that only a lost travel of the master cylinder 1 is covered, priority is given to the analog signal in the evaluation because the minimum movement of the second piston 3 will possibly not be sufficient to generate a digital signal in the first Hall-IC.

Consequently, the driver's wish can also be detected during ESP control intervention because minimal signal fluctuations, i.e. minimal changes in the magnetic field, can be identified by means of the second Hall-IC.

This means that the speed at which the driver is applying the brake pedal 43 can be detected in every case, meaning even in the case of an ESP control intervention. This allows detecting a panic stop, and the electronic control unit can trigger corresponding control operations. It is, for example, hereby possible to drive an electronically controlled pneumatic brake booster.

It is further possible to detect inclusions of air in the brake system by evaluating the analog signal. To this end, the analog signal is used to establish a theoretical pressure in the hydraulic connection 73, which is compared with the measured pressure of the pressure sensor 79.

In order to avoid accidents and reduce the consequences of an accident, it is principally possible to make the two signals available in a so-called danger computer in which data of various passive and active safety systems such as ESP, brake assist system, Adaptive Cruise Control (ACC), belt-tensioning system, airbags, etc., are collected and evaluated. Dependent on the rate of the risk potential, it is then e.g. possible to output information or alarms to the driver or to initiate more extensive safety measures.

LIST OF REFERENCE NUMERALS 1 master cylinder
2 piston
3 piston
4 pressure chamber
5 pressure chamber
6 housing
7 housing wall
8 piston wall
9 piston wall
10 sealing lip
11 sealing lip
12 sealing cup
13 sealing cup
14 resetting spring
15 resetting spring
16 end
17 end
18 piston bottom
19 piston bottom
20 collar
21 collar
22 sleeve
23 sleeve
24 wall
25 wall
26 peg
27 peg
28 end
29 end
30 stop
31 stop
32 collar
33 collar
34 piston portion
35 magnet
36 sensor element
37 plate
38 plate
39 plate
40 step
41 element
42 piston portion
43 brake pedal
70 brake system
71 brake booster
72 pressure fluid supply reservoir
73 brake line
74 brake line
75 wheel brake
76 wheel brake
77 wheel brake
78 wheel brake
79 pressure sensor
80 separating valve
81 separating valve
82 inlet valve
83 inlet valve
84 inlet valve
85 inlet valve
86 outlet valve
87 outlet valve 88 outlet valve
89 outlet valve
90 return line
91 return line
92 low-pressure accumulator
93 low-pressure accumulator
94 pressure fluid supply device
95 pressure fluid supply device
96 pressure channel
97 pressure channel
98 branch line
99 branch line
100 change-over valve
101 change-over valve
A actuating direction
I brake circuit
II brake circuit

The invention claimed is:

1. A method for controlling a motor vehicle comprising an electrohydraulic brake system with driving dynamics control, a master brake cylinder (1) operable by means of a brake pedal (43), at least one pressure fluid supply device (94, 95), the fluid supply being configured to be actuated by an electronic control unit and to apply hydraulic pressure to wheel brakes (75, 76, 77, 78) of the vehicle, the wheel brakes being connectable to the master brake cylinder (1), by way of a hydraulic connection (73, 74) that is closable by means of a separating valve (80, 81), an inlet valve (82, 83, 84, 85) and an outlet valve (86, 87, 88, 89) connected upstream of each of the wheel brakes (75, 76, 77, 78), and with a device for detecting brake application having a magnet (35) as a signal transmitter and a sensor element (36),
the method comprising the steps of
sensing a magnetic field change by means of the sensor element (36) upon movement of a piston of the master cylinder (1)
creating a digital signal and an analog signal by means of the sensor element,
passing on the two signals from the sensor element to an electronic control unit, and
evaluating the two signals in the electronic control unit,
wherein the digital signal is given priority over the analog signal in the evaluation upon brake application when no driving dynamics control operation is currently being performed in the vehicle.

2. The method as claimed in claim 1,
wherein the analog signal is given priority in the evaluation when the sensor element (36) senses a brake application during a driving dynamics control operation.

3. The method as claimed in claim 2,
wherein the analog signal is evaluated to identify the actuating speed of the brake pedal (43) in order to detect a panic stop of the driver and to trigger corresponding control operations by means of the electronic control unit.

4. The method as claimed in claim 3,
further comprising the step of measuring pressure by means of a pressure sensor,
wherein the analog signal is evaluated to establish a theoretical pressure in the hydraulic connection (73), which is compared with the pressure measured by the pressure sensor (79) in order to detect inclusions of air in the brake system.

5. An electrohydraulic brake system with driving dynamics control, a master brake cylinder (1) operable by means of a brake pedal (43), at least one pressure fluid supply device (94, 95) which can be actuated by an electronic control unit and the pressure of which can be applied to wheel brakes (75, 76, 77, 78) of the vehicle which are connectable to the master brake cylinder (1), by way of a hydraulic connection (73, 74) that is closable by means of a separating valve (80, 81), an inlet valve (82, 83, 84, 85) and an outlet valve (86, 87, 88, 89) connected upstream of each of the wheel brakes (75, 76, 77, 78), and with a device for detecting brake application which comprises a magnet (35) as a signal transmitter and a sensor element (36),
wherein
the sensor element (36) upon movement of a piston of the master cylinder (1) senses a change in the magnetic field and outputs a digital signal and an analog signal,
the two signals are passed on to an electronic control unit, and
the two signals are evaluated in the electronic control unit,
wherein a first Hall-IC and a second Hall-IC are provided in the sensor element (36), with the first Hall-IC furnishing the digital signal, while the second Hall-IC furnishes the analog signal, and wherein the electronic control unit is configured to give the digital signal priority over the analog signal when no driving dynamics control operation is currently being performed in the vehicle.

6. The brake system as claimed in claim 5,
wherein the magnet (35) is arranged on the piston (3) of the master cylinder (1), and the piston (3) includes a first cylindrical peg-shaped piston portion (34) for the arrangement of the magnet (35).

7. The brake system as claimed in claim 6,
wherein the piston (3) includes a second cylindrical peg-shaped portion (42) and an annular plate (39) for positioning the magnet (35) and for supporting a sleeve (22) on the second cylindrical peg-shaped portion (42), the sleeve being connected to another piston (2).

8. The brake system as claimed in claim 7,
wherein the annular plate (39) is fastened on the second cylindrical peg-shaped portion (42) by a deformation of the second cylindrical peg-shaped portion (42).

* * * * *

UNITED STATES PATENT AND TRADEMARK OFFICE
CERTIFICATE OF CORRECTION

| | | |
|---|---|---|
| PATENT NO. | : | 8,392,085 B2 |
| APPLICATION NO. | : | 10/582070 |
| DATED | : | March 5, 2013 |
| INVENTOR(S) | : | Schonlau et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2036 days.

Signed and Sealed this
First Day of September, 2015

Michelle K. Lee
*Director of the United States Patent and Trademark Office*